United States Patent [19]

Kawamura

[11] Patent Number: 5,515,211
[45] Date of Patent: May 7, 1996

[54] EDITING CONTROL METHOD AND APPARATUS PROVIDING COMPENSATION FOR DIFFERING MECHANICAL RISE-UP TIMES

[75] Inventor: Harumi Kawamura, Tokyo, Japan

[73] Assignee: Sony Corporation, Japan

[21] Appl. No.: 343,786

[22] Filed: Nov. 22, 1994

Related U.S. Application Data

[63] Continuation of Ser. No. 44,147, Apr. 7, 1993, abandoned.

[30] Foreign Application Priority Data

Apr. 24, 1992 [JP] Japan ................................... 4-129836

[51] Int. Cl.⁶ ................................................. G11B 27/02
[52] U.S. Cl. .......................... 360/14.2; 360/15; 360/72.1; 358/335; 369/84
[58] Field of Search ......................... 360/13, 14.1, 14.2, 360/15, 71, 72.1, 72.2, 73.02; 358/335; 369/84

[56] References Cited

U.S. PATENT DOCUMENTS 4,322,747  3/1982  Dischert et al. .................... 360/14.2 X
5,027,232  6/1991  Sekii et al. ............................ 360/15 X
5,097,461  3/1992  Majima ................................. 360/15 X
5,119,242  6/1992  Murray ................................. 360/14.2

OTHER PUBLICATIONS

U.S. Application Ser. No. 08/009,789 Nagano et al.
U.S. Application Ser. No. 08/023,171 Nagano et al.

*Primary Examiner*—Andrew L. Sniezek
*Attorney, Agent, or Firm*—Limbach & Limbach; Philip M. Shaw, Jr.

[57] ABSTRACT

Transmission and reception of control signals and response signals are made through bidirectional communication lines between a control device and a reproducing VTR and between the control device and a recording VTR to measure rise-up times D1 and D2 of mechanical systems of the reproducing VTR and the recording VTR. Thereafter, the tapes of the reproducing VTR and the recording VTR are rewound from their editing points by a predetermined time T, and then kept to a pause state. Subsequently, when a nominal time X for releasing the pause of the reproducing VTR and the recording VTR is specified, the reproducing VTR and the recording VTR actually receive the control signal to release from pause at a time of X-D1 and a time of X-D2 respectively, and the recording VTR is so controlled as to start its recording operation at a time of X+T.

9 Claims, 7 Drawing Sheets

(a)

(b)

SPECIFIED TIME 0

5,515,211

EDITING CONTROL METHOD AND APPARATUS PROVIDING COMPENSATION FOR DIFFERING MECHANICAL RISE-UP TIMES

This is a continuation of application Ser. No. 08/044,147 filed on Apr. 7, 1993, now abandoned.

BACKGROUND OF THE INVENTION

1. Field of the Invention

This invention relates to a method and apparatus using a computer to control editing on video equipment, audio equipment, etc. (hereinafter referred to as "AV devices").

2. Background of the Invention

A control system for performing editing control for AV devices using a computer has been previously proposed in Japanese Patent Application No. 3-192640 by Kawamura.

In this control system, a personal computer (hereinafter referred to as "PC") is connected to the AV devices through a bidirectional communication line, and a control signal for controlling the operation of the AV devices is transmitted from the PC to the AV devices on the basis of a communication protocol called VISCA (Video System Control Architecture: Trademark), thereby performing the editing control for the AV devices.

One of the features of this control system is that both the PC and the AV devices have a clock having the same time, and a response signal transmitted from the AV equipment to the PC includes a time information of the clock in the AV devices. In this control system, the following operation is carried out when a video signal reproduced from a reproducing VTR is recorded by a recording VTR.

First, the PC supplies each of the reproducing VTR and the recording VTR with a control signal for rewinding a tape of each VTR from an editing point thereof by a predetermined time T, and setting each VTR to a pause mode. Subsequently, upon completion of the setting of the pause mode, the PC supplies these VTRs with a control signal for simultaneously releasing from pause mode at a predetermined time (hereinafter called the "pause-release setting time"). Subsequently, upon completion of the release of the VTRs from pause mode, the PC supplies each VTR with a control signal for inquiring about a tape position. Time information ,and the tape position of each VTR is transmitted to the PC. On the basis of the tape positions and the time information, the PC calculates a deviation of the tape position between the VTRs. If no deviation occurs in the tape position, the PC supplies the recording VTR with a control signal for setting the recording VTR to a recording mode at an instantaneous time when the predetermined time T elapses from the pause-release setting time. If a deviation occurs in the tape position, the tape position is adjusted by travelling the tape by a suitable amount (hereinafter referred to as "tape-travel adjustment"). The PC then supplies the recording VTR with the control signal for setting the recording mode in the same manner as described above. Through the above operation, a picture of the reproducing VTR which is subsequent to the editing point is recorded by the recording VTR.

In the control system as described above, however, even when the PC simultaneously supplies the reproducing and recording VTRs with the control signals to release from pause mode, the time when each of the reproducing and recording VTRs begins to advance its tape is delayed in accordance with the delay of rise-up of the mechanical system of each VTR.

Therefore, when the mechanical systems of the reproducing and recording VTRs have different rise-up times, these reproducing and recording VTRs are simultaneously released from the pause mode at a predetermined time, the tape positions of these VTRs are deviated due to the difference in rise-up time of the mechanical systems. Therefore, the tape-travel adjustment is required, and thus the timing to start a picture recording operation is delayed. Further, when the tape is edited without tape-travel adjustment, a head portion of a reproducing tape may not be recorded on a recording tape, or may be recorded superimposed on a portion of the recording tape where information has been already recorded. This is because of the deviation between the editing point of the reproducing tape and the editing point of the recording tape.

SUMMARY OF THE INVENTION

An object of this invention is to provide an editing control method and apparatus for AV devices in which high-precision editing is performed even when mechanical systems of the reproducing and recording devices have different rise-up times.

In order to attain the above object, an editing control method and device for AV devices in which a reproducing signal of a reproducing tape of a first AV device is recorded on a recording tape of a second AV device using a control system including a control device is disclosed. The control device and at least one AV device each have a clock having the same time. The control device transmits a control signal for controlling the operation of the AV devices and the AV devices transmit a response signal, including a time information, in accordance with the control signal. First, the rise-up times $D1$ and $D2$ of mechanical systems of the first and second AV devices, respectively, are calculated on the basis of tape positions of the first and second AV devices at a pause time, tape positions of the first and second AV devices at a time after provision of an instruction for releasing the pause, and time information when the tape positions are detected. The tapes of the first and second AV devices are then rewound from editing points by a predetermined time T and put in a pause state. The first and second AV devices are then controlled so that when a pause-release time $X$ for the first and second AV devices is specified, the first and second AV devices start their reproducing operations at times of $X-D1$ and $X-D2$ respectively. The second AV device is further controlled to start its recording operation at a time of $X+T$.

According to this editing control method for AV devices, the control device measures beforehand the rise-up times of the mechanical systems of the first and second AV devices, and controls the AV devices such that when a reproduction start time $X$ for the first and second AV devices is specified in an editing, the first and second devices are instructed to release from the pause mode at times earlier than the specified pause-release time $X$ by the respective rise-up times of the mechanical systems thereof. Even if there occurs a difference between the rise-up times of the mechanical systems of the first and second AV devices, the control system has adjusted for this difference by the time that the operation of the mechanical systems is settled to a stable state, so that there occurs no deviation in tape position between the first and second AV devices. In this way high-precision editing can be realized.

DETAILED DESCRIPTION OF PREFERRED EMBODIMENTS

Preferred embodiments according to this invention will be described hereunder with reference to the accompanying drawings.

Figure 1:
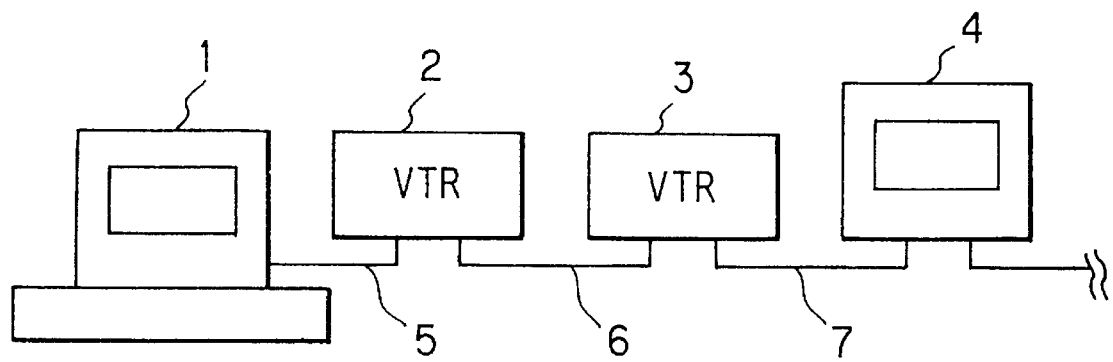
FIG. 1 is a block diagram showing the construction of a control system to which an embodiment according to this invention is applied.

FIG. 1 is a block diagram showing the construction of a control system to which an embodiment of this invention is applied.

The control system includes a control device 1 such as a personal computer (PC) or the like, a first VTR 2, a second VTR 3, a first monitor 4, and bidirectional communication lines 5, 6 and 7. The control device 1 transmits various control signals through the bidirectional communication lines 5, 6 and 7 to the first VTR 2, the second VTR 3 and the first monitor 4, and each of the first VTR 2, the second VTR 3 and the first monitor 4 transmits a response signal for the control signal to the control device 1. The communication operation as described above is carried out on the basis of VISCA.

Figure 2:
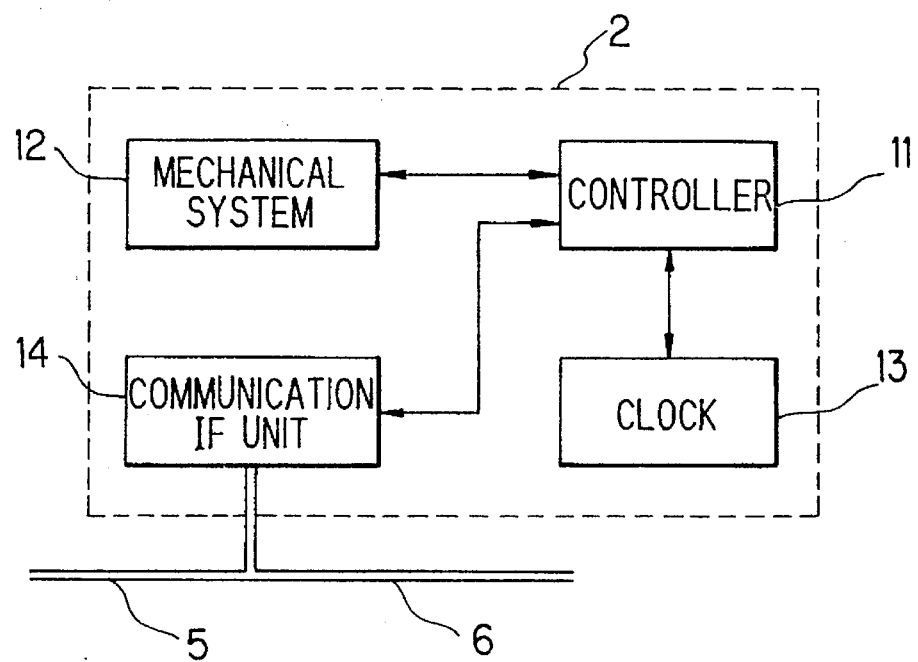
FIG. 2 is a block diagram showing the construction of a control unit group of a first VTR in the control system as shown in FIG. 1.

FIG. 2 is a block diagram showing the construction of a control unit group of the first VTR 2 in the control system as shown in FIG. 1.

The first VTR 2 includes a control unit 11, a mechanical system 12, a clock 13, and a communication interface (IF) unit 14. The control unit 11 comprises a microcomputer, and performs an overall control for the first VTR 2. The mechanical system 12 serves to perform the loading, travelling, stopping and other operations for the tape. The clock 13 comprises hardware including a quartz oscillator and a counter for dividing an output of the quartz oscillator, or a software. The clock 13 serves to generate time information on each figure of time, minute, second and (1/300) second. The communication interface unit 14 serves as an interface for performing communication between the control unit II and the control device 1. Both the second VTR 3 and the first monitor 4 have the same control unit group as the first VTR 2.

Each figure of the clock equipped in each AV device is reset to "0" in response to a reset signal transmitted from the control device 1 so that the clocks of the control device 1 and each AV device are set to a state where they display the same time. When receiving the control signal instructing the setting of the operation mode from the control device 1, each AV device, for example, the first VTR 2 sets the specified operation mode, and then transmits the response signal to the control device when the setting of the specified operation mode is completed. When receiving the control signal inquiring about a position information of the tape, the tape position of the mechanical system 12 is detected, and a detected time is read out from the clock 13. Subsequently, the tape position information and the corresponding time information are output to the control device 1.

Figure 3:
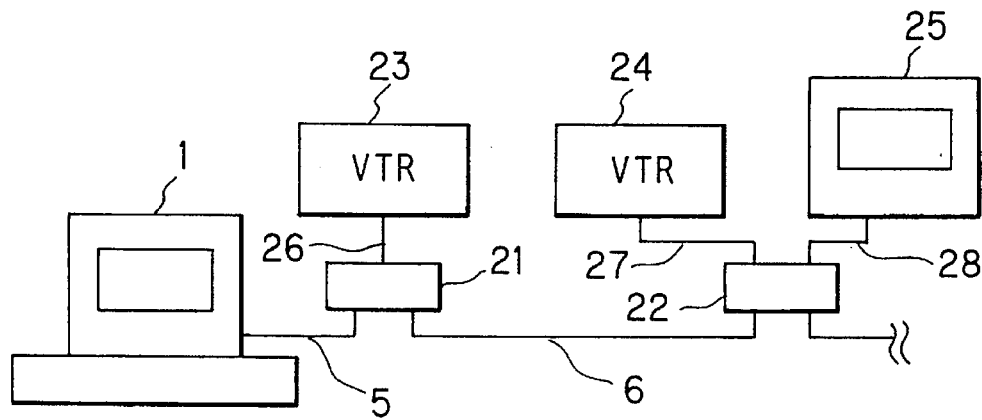
FIG. 3 is a block diagram showing the construction of another control system to which an embodiment according to the present invention is applied.

FIG. 3 is a block diagram showing the construction of another control system to which an embodiment of this invention is applied.

In the control system as shown in FIG. 1, the function of communicating with the control device 1 and the clock having the same time as the control device are provided to each of the first and second VTRs 2 and 3 and the first monitor 4. However, in the control system as shown in FIG. 3, these functions are provided to first and second control boxes 21 and 22 which are connected between the control device 1 and each of the third and fourth VTRs 23 and 24 and a second monitor 25. The first control box 21 and the third VTR 23 are connected through a bidirectional communication line 26. The second control box 22 and each of the fourth VTR 24 and the second monitor 25 are connected through bidirectional communication lines 27 and 28, respectively. This control system enables an editing control for existing AV devices which are equipped with no computer and no communication function based on VISCA.

Figure 4:
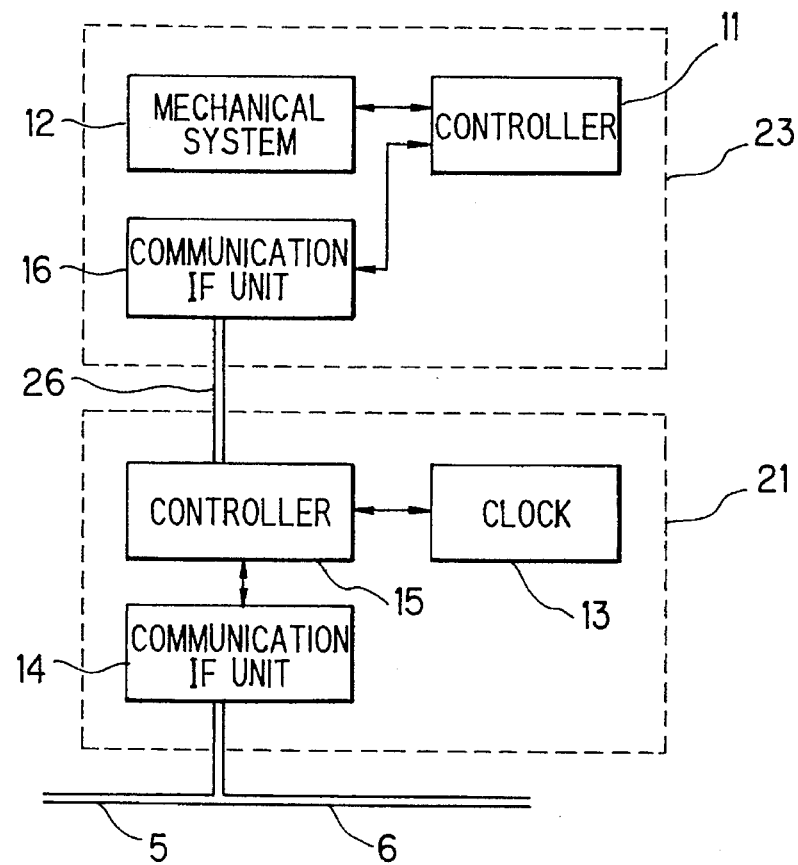
FIG. 4 is a block diagram showing the construction of a first control box and a control unit group of a third VTR in the control system of FIG. 3.

FIG. 4 is a block diagram showing the construction of the first control box 21 and the construction of the control unit group of the third VTR 23 in the control system as shown in FIG. 3. In FIG. 4, means represented by reference numerals which are present in FIG. 2 are the same as the means described in the descriptions of FIG. 2.

The first control box 21 is equipped with a communication interface unit 14, a clock 13 and a control unit 15 comprising a microcomputer. The control unit 15 serves to convert a communication protocol between the control device 1 and the communication interface unit 14 to a communication protocol for enabling a communication with the communication interface unit 16 of the third VTR 23, for example, LANC (Local Application Control Bus System: Trademark). The second control box 22 is also equipped with the same control unit group as the first control box 21.

The third VTR 23 is equipped with a control unit 11, a mechanical system 12 and a communication interface unit 16. The communication interface unit 16 serves as an interface for performing a communication with the control unit 15 of the first control box 21. Both the fourth VTR 24 and the second monitor 25 have the same control unit group as the third VTR 23.

Each figure of the clock which is equipped to each control box is reset to "0" in response to a reset signal transmitted from the control device 1, so that the clocks of the control device 1 and each control box are set to such a state where they display the same time. When receiving a control signal inquiring about the position information of the tape of the third VTR 23 from the control device, each control box, for example, the first control box 21 converts the communication protocol and then transmits the converted protocol to the third VTR 23. Subsequently, the tape position information transmitted from the third VTR 23 in addition to the time information of the clock 13 is outputted to the control device 1.

FIGS. 1 to 4 show only the control unit group, and signal lines through which video signals and audio signals are transmitted among the first VTR 2, the second VTR 3 and the first monitor 4, and among the third VTR 23, the fourth VTR 24 and the second monitor 25.

The following is a description for a case where a video signal reproduced by the first VTR 2 is recorded by the second VTR 3 in the control system as shown in FIG. 1 using an editing method according to the embodiment of this invention.

Figure 5:
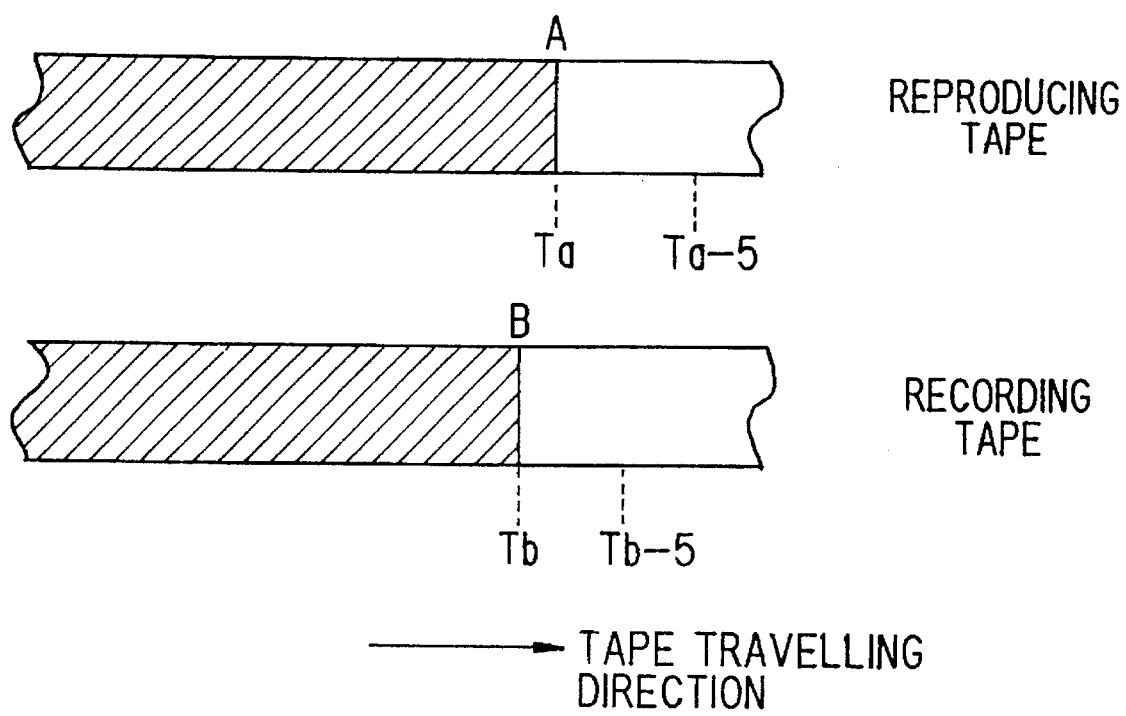
FIG. 5 is a schematic view showing editing points of reproducing and recording tapes of to which an embodiment according to the present invention is applied.

FIG. 5 schematically shows the editing points on the tape set in the first VTR 2 (hereinafter referred to as "reproducing tape") and the tape set in the second VTR 3 (hereinafter referred to as "recording tape"). In this embodiment, a portion of the reproducing tape which is located subsequently to the tape position A is to be recorded on a portion of the recording tape which is located subsequently to the tape position B corresponding to the end of a recorded portion of the recording tape. Here, Ta represents a time code at the position A of the reproducing tape, and Tb represents a time code at the position B of the recording tape. If an RC (Rewritable Consumer) time code, a VITC (Vertical Interval Time Code) or a count value of a control signal (CTL) or the like is used as a time code, an editing of every frame can be performed.

Figure 6:
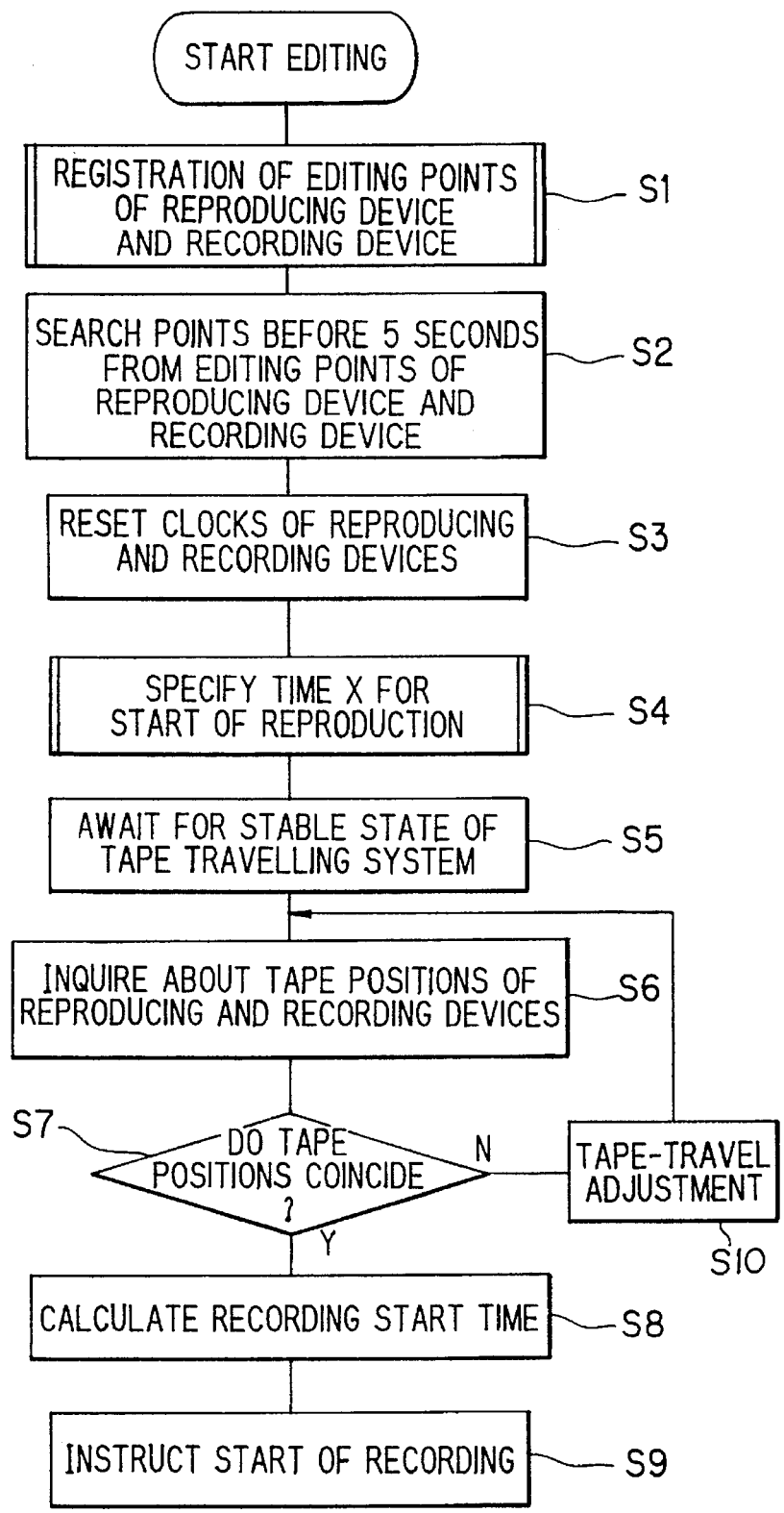
FIG. 6 is a flowchart for an editing control method which is one embodiment according to this invention.
Figure 7:
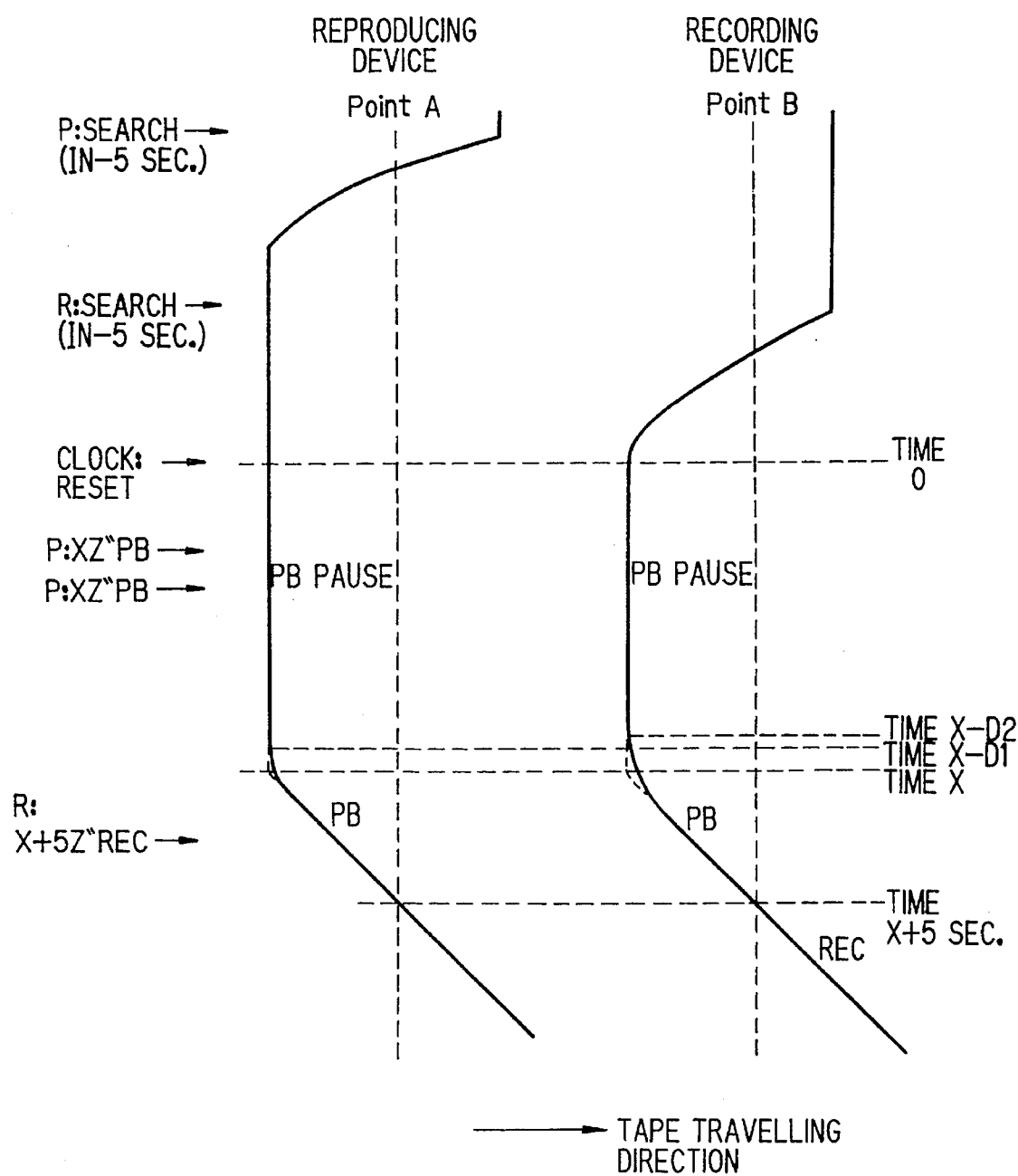
FIG. 7 is a schematic view showing the operation of the reproducing and recording tapes during an embodiment according to this invention.

FIG. 6 is a flowchart for an editing control method of the embodiment according to this invention, and FIG. 7 schematically shows a travelling operation for the reproducing and recording tapes.

The editing control operation of this embodiment will be hereunder described with reference to FIGS. 1 and 2 and FIGS. 5 to 7. In the following description, the first VTR is referred to as a reproducing device, the second VTR is referred to as a picture-recording device, and the first monitor is referred to as monitor.

First, an user manipulates the control device 1 to set the reproducing device 2 to a reproducing mode, then stops the reproducing tape at a desired position A (editing point) while watching the monitor 4, and then registers the time code Ta in a storage device (not shown) of the control device 1. Likewise, the user sets the picture-recording device 3 to the reproducing mode, then stops the recording tape at a desired position B (editing point) while watching the monitor 4, and then registers the time code Tb in the storage device of the control device 1 (at step S1 in FIG. 6).

Upon completion of the registration of the time codes Ta and Tb, the control device 1 controls the reproducing device 2 to rewind its tape from the editing point A to a point before 5 seconds from the editing point A, that is, to the position where the time code corresponds to (Ta-5) seconds, and then controls the picture-recording device 3 to rewind its tape from the editing point B to a point before 5 seconds from the editing point B, that is, to the position where the time code corresponds to (Tb-5) seconds (step S2 of FIG. 6, P:search and R:search in FIG. 7). The mechanical systems 12 of the reproducing device and the picture-recording device 3 are in stand-by in a pause mode. The rewinding operations of the reproducing and recording devices 2 and 3 are successively carried out as described above because the control device 1 is connected to both of the reproducing device 2 and the picture-recording device 3 through a serial communication line and thus the communications between the control device 1 and the reproducing device 2 and between the control device 1 and the picture-recording device 3 can not be simultaneously controlled. If the control device 1 is connected to both of the reproducing device 2 and the picture-recording device 3 through a bus-type communication line, the communications therebetween can be simultaneously controlled.

The operation of the control unit group of the reproducing device 2 at this time will be briefly described hereunder with reference to FIGS. 1 and 2. When the control device 1 transmits to the reproducing device 2 a control signal for stopping the reproducing tape at the position of (Ta-5) seconds, the control signal is input through the bidirectional communication line 5 and the communication interface unit 14 to the control unit 11. The control unit 11 analyzes the control signal to transmit a travel instruction to the mechanical system 12. Thereafter, the control unit 11 transmits a pause instruction to the mechanical system 12 when the time code output from the mechanical system 12 corresponds to (Ta-5) seconds, and transmits, to the control device 1, a response signal, comprising a representation that the recording tape has paused at the position of (Ta-5) seconds in addition to the time information of the clock 13. The operation of the control unit group of the picture-recording device 3 is carried out in the same manner.

Subsequently, the control device 1 supplies each of the reproducing and picture-recording devices 2 and 3 with a control signal (reset signal) for setting the time of the clock of each device to "0" (at step S3, clock:Reset). Subsequently, the user specifies the time X for setting the reproducing and picture-recording devices 2 and 3 to release from the pause mode through manipulation of the control device 1 (at step S4, PB for P:X, PB for R:X). The time X is set to a time longer than the transmission delay times of the control and response signals between the control device 1 and each of the reproducing and picture-recording devices 2 and 3 and the rise-up times of the mechanical systems 12 of the reproducing and picture-recording devices 2 and 3.

Figure 8:
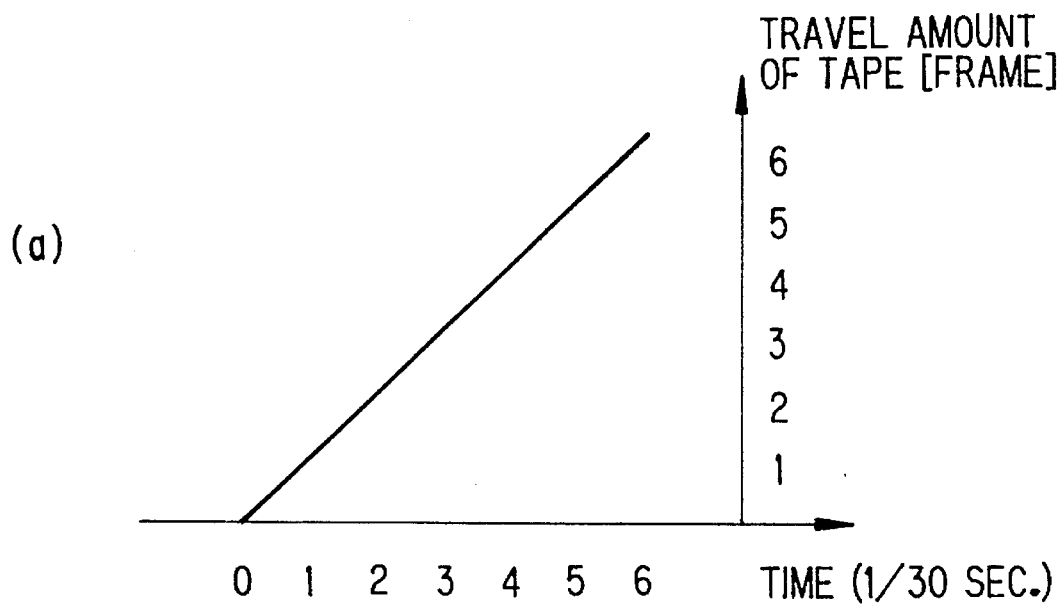
FIG. 8 shows graphs for rise-up times of mechanical systems of reproducing and recording AV devices.
Figure 8:
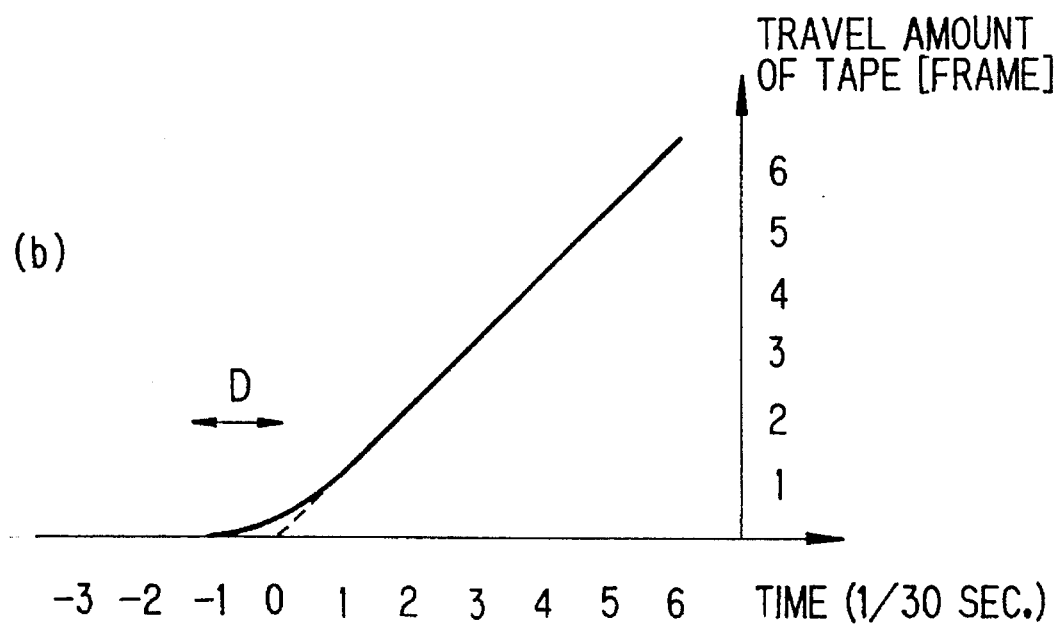

Here, the rise-up times of the mechanical systems 12 of the reproducing and picture-recording devices 2 and 3 will be described. FIG. 8 shows graphs for the rise-up time of the mechanical system 12, where (a) represents a characteristic graph of an ideal rise-up time, and (b) represents a characteristic graph of a delayed rise-up time.

In the case of the characteristic of the ideal rise-up time as shown in FIG. 8(a), when an instruction for releasing from the pause mode at the time 0 is supplied, the relation between the time lapse from the time 0 and the travel amount of the tape is linear and the travel amount of the tape is equal to the time lapse (as shown in FIG. 8(a)).

On the other hand, in the case of the characteristic of the delayed rise-up time, even when an instruction for starting the reproduction at the time 0 is supplied, some rise-up time D is required until the tape travel is settled to a stable state from the start of the reproduction, and the relation between the time lapse from the time 0 and the travel amount of the tape is not linear, and the tape travel amount is not equal to time lapse, until the rise-up time D elapses (as shown in FIG. 8(b)). In order to make the relation between the time lapse from the time 0 and the travel amount of the tape to be coincident with the ideal rise-up time characteristic as shown in FIG. 8(a), it is necessary to start the reproduction earlier than the time 0 by the rise-up time D (about 1/30 second in FIG. 8).

If there is a difference between the rise-up times D1 and D2 of the mechanical systems 12 of the reproducing and picture-recording devices 2 and 3 as described above, then the tape positions of the reproducing and picture-recording devices 2 and 3 are also deviated due to the difference in rise-up time even when the mechanical systems of the reproducing and picture-recording devices 2 and 3 are simultaneously actuated at the time X. This means that there occurs a case where the tape-travel adjustment is required to be carried out and thus the timing of the start of the picture recording is delayed. If an editing is carried out without tape-travel adjustment, the editing point A of the reproducing tape and the editing point B of the recording tape are deviated from each other, the head portion of the reproducing tape is not recorded, or is recorded superimposed over the recorded portion of the recording tape.

In order to overcome the above disadvantage, this embodiment is so constructed that the rise-up times D1 and D2 of the mechanical systems 12 of the reproducing device 2 and the picture-recording device 3 are measured beforehand by the control device 1. When the user specifies the time X, the control device 1 transmits the control signal for starting the reproduction at a time earlier than the time X by the rise-up time D1 and D2 for the reproducing and picture-recording devices 2 and 3 respectively. With this construction, when the rise-up time is long, the pause release operation is started at an earlier time to compensate for the long rise-up time. Therefore, by the time that the operation of both of the mechanical systems 12 are stable, the difference in rise-up time between the mechanical systems 12 of the reproducing device 2 and the picture-recording device 3 has been compensated. The relation between the time subsequent to the time X and the tape travel amount becomes linear like the ideal rise-up time characteristic as shown in FIG. 8(a). Therefore, the tape-travel adjustment is hardly required, and the delay of the picture-recording start timing and the deviation from the editing point can be minimized.

Figure 9:
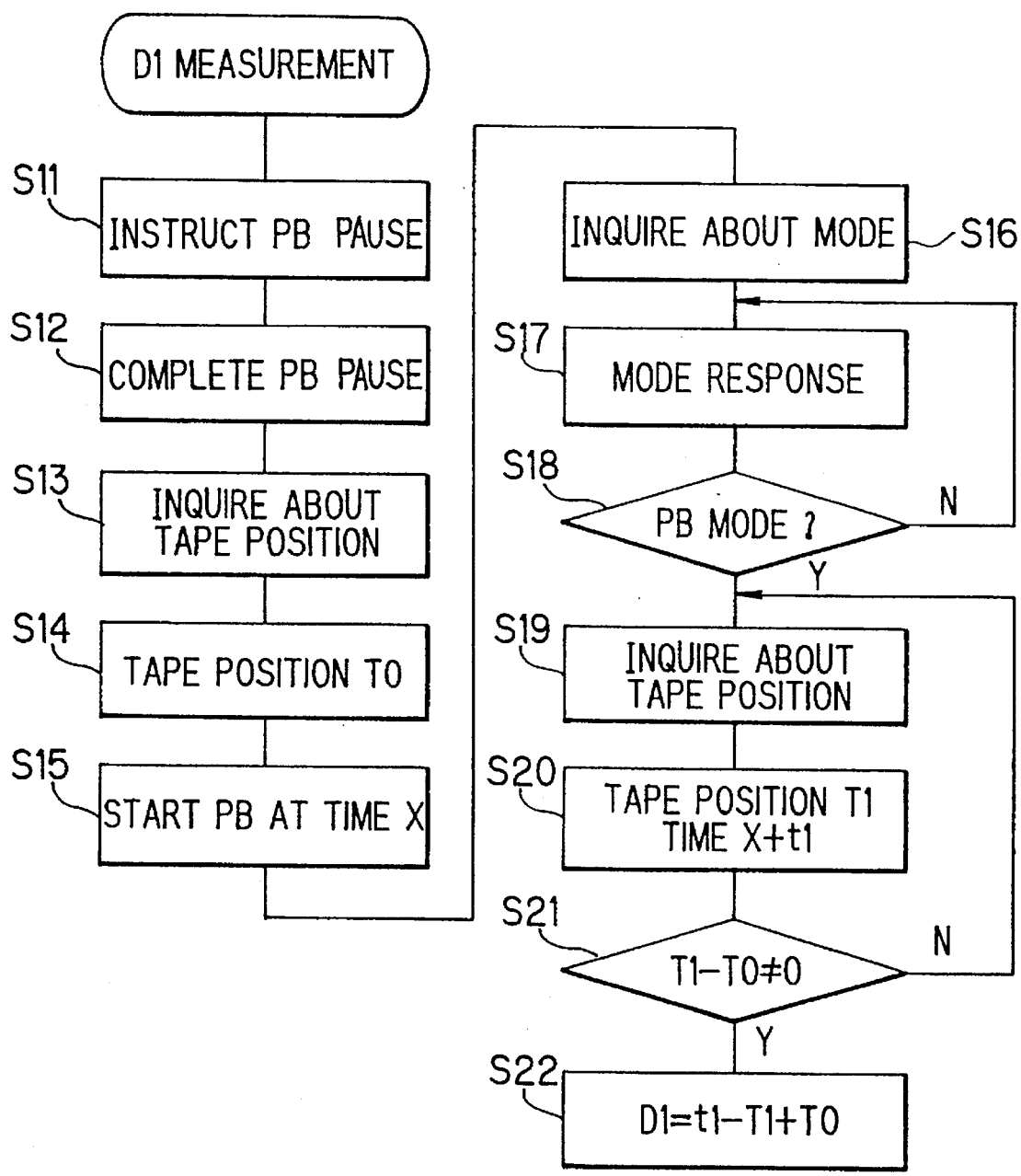
FIG. 9 is a flowchart for a rise-up time measuring method for a mechanical system in an embodiment according to this invention.

A method of calculating the rise-up time D1 of the mechanical system 12 of the reproducing device 2 using the control system as shown in FIG. 1 will be hereunder described with reference to FIG. 9.

First, a control signal for setting the reproducing device 2 to the reproduction pause state is transmitted (at step S11). Thereafter, a response signal indicating the setting of the reproducing device 2 to the reproduction pause state is received at the PC1 (step S12).

Subsequently, a control signal for inquiring about the tape position is transmitted to the reproducing device 2 (step S13), and then a response signal indicating that the tape time code position of the reproducing device 2 is T0 is received (step S14).

Subsequently, a control signal for releasing the pause at the time X is transmitted to the reproducing device 2 (step S15), and then a control signal for inquiring about the operation mode is transmitted to the reproducing device 2 (step S16). Thereafter, a response signal indicating the operation mode of the reproducing device 2 is received (step S17) to determine whether the operation mode of the reproducing device 2 has indeed been released from the pause mode or not (step S18). In place of the steps S16 to S18, a process for awaiting for a constant time may be carried out.

If the operation mode of the reproducing device 2 is determined to be released from pause mode, then the control signal for inquiring the tape position is transmitted (step S19). A response signal indicating the tape time code position T1 and the time information X+t1 of the clock 13 when the tape position is detected is then received (step S20).

Subsequently, it is judged whether T1-T0 is equal to 0 (step S21). If T1-T0 is not equal to 0, then the rise-up time D1 of the mechanical system 12 of the reproducing device 2 is calculated on the basis of a calculation expression (D1=t1−T1+T0) (step S22). The rise-up time D2 of the mechanical system of the picture-recording device 3 can be also calculated in the same manner.

Through the above process, the measurement of the rise-up times D1 and D2 of the mechanical systems 12 of the reproducing device 2 and the picture-recording device 3 is completed. Further description of an editing control operation embodiment follows.

After the editing start instruction is made at a step S4, the control device 1 awaits its operation until the mechanical systems 12 of the reproducing device 2 and the picture-recording device 3 are settled to the stable state, and inquires about the tape positions to the reproducing device 2 and the picture-recording device 3 when the mechanical systems 12 are settled to the stable state (steps S5 and S6). Upon receiving the control signal inquiring about the tape position, the reproducing device 2 reads out a time code (Ta-T2) from the mechanical system 12 and a time information t2 of the clock 13, and transmits this information to the control device 1. Likewise, upon receiving the control signal for inquiring about the tape position, the picture-recording device 3 reads out a time code (Tb-T3) from the mechanical system 12 and a time information t3 of the clock 13, and transmits this information to the control device 1.

The control device 1 compares the time code (Ta-T2) and time information t2 transmitted from the reproducing device 2 with the time code (Tb-T3) and time information t3 transmitted from the picture-recording device 3 to determine whether the tape positions of the reproducing tape and the picture-recording tape are coincident with each other (step S7). Here, it is assumed that the time code and the time information which are transmitted from the reproducing device 2 represent a tape position (Ta-T2) at a time t2, and the time code and the time information which are transmitted from the picture-recording device 3 represent a tape position (Ta-T3) at a time t3. Representing the steady state tape travel speed of the reproducing device 2 and the picture-recording device 3 by V, the tape of the reproducing device 2 travels at a distance of V·(t3-t2) for a time between t2 and t3. Therefore, the tape position of the reproducing tape at the time t3 corresponds to a value of Ta-T2+V·(t3-t2). If this value is equal to Ta-T3, the tape positions of the reproducing device 2 and the picture-recording device 3 are positionally coincident with each other.

If the tape positions of the reproducing device 2 and the picture-recording device 3 are coincident with each other, the control device 1 sets a picture-recording start time to X+T (step S8, REC at R:X+T), where T=5 seconds, for example, and supplies the picture-recording device 3 with a control signal for starting the picture-recording operation at the time of (X+5) second (step S9). On the other hand, if the tape positions are not coincident with each other, a tape-travel adjustment is carried out, and then the tape position is inquired again (step S10).

This invention is not limited to the above embodiments, and various modification may be made to the embodiments without departing from the subject matter of this invention.

For example, this invention is applicable not only to the editing for a VTR, but also to AV devices using a tape such as a DAT, a PCM processor, a tape recorder, etc.

Further, this invention is also applicable for the recording of output signals of AV devices such as a laser disk player, a CD player, an electronic musical instrument, a tuner, etc. Since these AV devices have no mechanical system or have a negligible rise-up time even if they have a mechanical system, only the rise-up time of a mechanical system at a recording side such as a VTR or, a DAT or the like may be measured.

Still further, in the above embodiments, the editing points of the reproducing tape and the recording tape are determined on the first monitor. However, the following construction may be adopted in place of the above construction. That is, a video board is provided to the control device 1, and the video signals output from the first and second VTRs are input to the control device to determine the editing points on a screen of the control device 1.

Still further, in the above embodiments, the editing of a picture signal of an NTSC system is carried out, however, this invention is also applicable to the editing of a picture signal of another system such as a PAL system.

As described above, according to this invention, the rise-up times of the mechanical systems of the first and second AV equipments are measured beforehand, and the first and second AV devices are controlled so that when the reproduction start time X is specified for the first and second AV devices in an editing, the reproducing operations of the first and second AV devices are started at earlier times than the specified reproduction start time X by the rise-up times of the mechanical systems of the first and second AV devices, respectively. Therefore, even when there is a difference between the rise-up times of the mechanical systems of the first and second AV devices, the specified operation can be started for the first and second AV devices at the specified time. Accordingly, a high-precision editing, a timer reservation, etc. can be realized.

What is claimed is:

1. An editing control method for audio-visual (AV) devices for reproducing a signal of a first tape of a first AV device and recording the reproduced signal on a second tape of a second AV device using a control system including a control device, at least one of the first AV device or the second AV device having the same time information as the control device, by transmitting from the control device a control signal for controlling the operation of the first and second AV devices and transmitting from the first and second AV devices a response signal including time information in accordance with the control signal, and wherein the improvement comprises the steps of:

(a) first measuring rise-up times D1 and D2 of mechanical systems of each of the first and second AV devices, respectively, on the basis of tape positions of the first and second AV devices at a pause time thereof, tape positions after an instruction for releasing the pause at a predetermined time, and time information when the tape positions are detected;

(b) rewinding tapes of the first and second AV devices from editing points A and B, respectively, by a predetermined time T and then keeping the first and second AV devices in a pause state;

(c) controlling the first and second AV devices so that when a pause-release time X for the first and second AV devices is specified, the first and second AV devices release from the pause state at times of X-D1 and X-D2 respectively; and (d) controlling the second AV device to start a recording operation at a time of X+T.

2. The editing control method as claimed in claim 1, wherein at least one of said first and second AV devices has a clock, and further comprising the step of transmitting a reset signal from said control device to reset the clock.

3. The editing control method as claimed in claim 1, comprising the step of specifying the tape position by a specifying a time code recorded on the tape.

4. An editing control apparatus for audio-visual (AV) devices for reproducing a signal of a first tape of a first AV device and recording the reproduced signal on a second tape of a second AV device using a control system including a control device, at least one of the first AV device or the second AV device having the same time information as the control device, by transmitting from the control device a control signal for controlling the operation of the first and second AV devices and transmitting from the first and second AV devices a response signal including time information in accordance with the control signal, and wherein the improvement comprises:

(a) means for first measuring rise-up times D1 and D2 of mechanical systems of each of the first and second AV devices, respectively, on the basis of tape positions of the first and second tapes at a pause time thereof, tape positions after an instruction for releasing the pause at a predetermined time, and time information when the tape positions are detected;

(b) means for causing the first and second AV devices to rewind the first and second tapes from editing points A and B, respectively, by a predetermined time T and then keeping the first and second AV devices in a pause state;

(c) means for controlling the first and second AV devices so that when a pause-release time X for the first and second AV devices is specified, the first and second AV devices release from the pause state at times of X-D1 and X-D2 respectively; and (d) controlling the second AV device to start a recording operation at a time of X+T.

5. The editing control apparatus as claimed in claim 4, wherein at least one of said first and second AV devices has a clock, and further comprising means for transmitting a reset signal from said control device to reset the clock.

6. The editing control apparatus as claimed in claim 4, wherein the tape position is specified by specifying a time code recorded on the tape.

7. The editing control apparatus as claimed in claim 4, wherein said control device comprises a control box having a main control device and a clock function.

8. The editing control apparatus as claimed in claim 4, wherein each of said first and second AV devices comprises a video tape recorder.

9. The editing control apparatus as claimed in claim 4, wherein each of said first and second AV devices has a communication interface unit for performing a communication with said control device.

* * * * *